(12) United States Patent
Hosaka et al.

(10) Patent No.: US 9,158,450 B2
(45) Date of Patent: Oct. 13, 2015

(54) HANDWRITING INPUT DEVICE AND HANDWRITING INPUT CONTROL PROGRAM

(71) Applicants: Kenta Hosaka, Sagamihara (JP);
Toshihiro Motoi, Toshima-ku (JP);
Yoichi Kawabuchi, Itami (JP);
Yasuhiko Yamaguchi, Hino (JP); Takao Shudo, Chofu (JP); Shunsuke Takamura, Kokubunji (JP)

(72) Inventors: Kenta Hosaka, Sagamihara (JP);
Toshihiro Motoi, Toshima-ku (JP);
Yoichi Kawabuchi, Itami (JP);
Yasuhiko Yamaguchi, Hino (JP); Takao Shudo, Chofu (JP); Shunsuke Takamura, Kokubunji (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 205 days.

(21) Appl. No.: 13/659,214

(22) Filed: Oct. 24, 2012

(65) Prior Publication Data

US 2013/0106748 A1 May 2, 2013

(30) Foreign Application Priority Data

Nov. 2, 2011 (JP) ................................ 2011-240853

(51) Int. Cl.
*G06F 3/0488* (2013.01)
*G06F 9/44* (2006.01)

(52) U.S. Cl.
CPC ............ *G06F 3/0488* (2013.01); *G06F 9/4443* (2013.01)

(58) Field of Classification Search
CPC ..................................................... G06F 3/0488
See application file for complete search history.

(56) References Cited

U.S. PATENT DOCUMENTS

| | | | |
|---|---|---|---|
| 6,668,081 B1 | 12/2003 | Ilan et al. | |
| 8,552,996 B2 * | 10/2013 | Morita | 345/173 |
| 8,869,059 B2 * | 10/2014 | Aono et al. | 715/773 |
| 2007/0180400 A1 * | 8/2007 | Zotov et al. | 715/788 |
| 2010/0164877 A1 | 7/2010 | Yu et al. | |

FOREIGN PATENT DOCUMENTS

| | | |
|---|---|---|
| JP | 9-230991 H | 9/1997 |
| JP | 2000-194869 A | 7/2000 |
| JP | 2002-202934 A | 7/2002 |
| JP | 2006-119712 A | 5/2006 |
| JP | 2007-305039 A | 11/2007 |
| JP | 2011-053986 A | 3/2011 |
| WO | 2008/001771 A1 | 1/2008 |

OTHER PUBLICATIONS

Japanese Office Action (Notice of Reasons for Refusal) dated Oct. 18, 2013, issued by the Japanese Patent Office in corresponding Japanese Patent Application No. 2011-240853, and English language translation of Office Action. (5 pages).

* cited by examiner

*Primary Examiner* — Jason Olson
(74) *Attorney, Agent, or Firm* — Buchanan Ingersoll & Rooney PC

(57) ABSTRACT

A handwriting input device in which a handwriting input is possible to a touch panel which is superimposed on a display screen including: an inputted contents processing section for recognizing a content by the handwriting input and setting up a area on the display screen based on an recognition result; an application software determining section for determining an application software which should be started up based on the recognition result and starting up the application software; and a result processing section for inserting information acquired by the started application software into the area and displaying on the display screen.

8 Claims, 16 Drawing Sheets

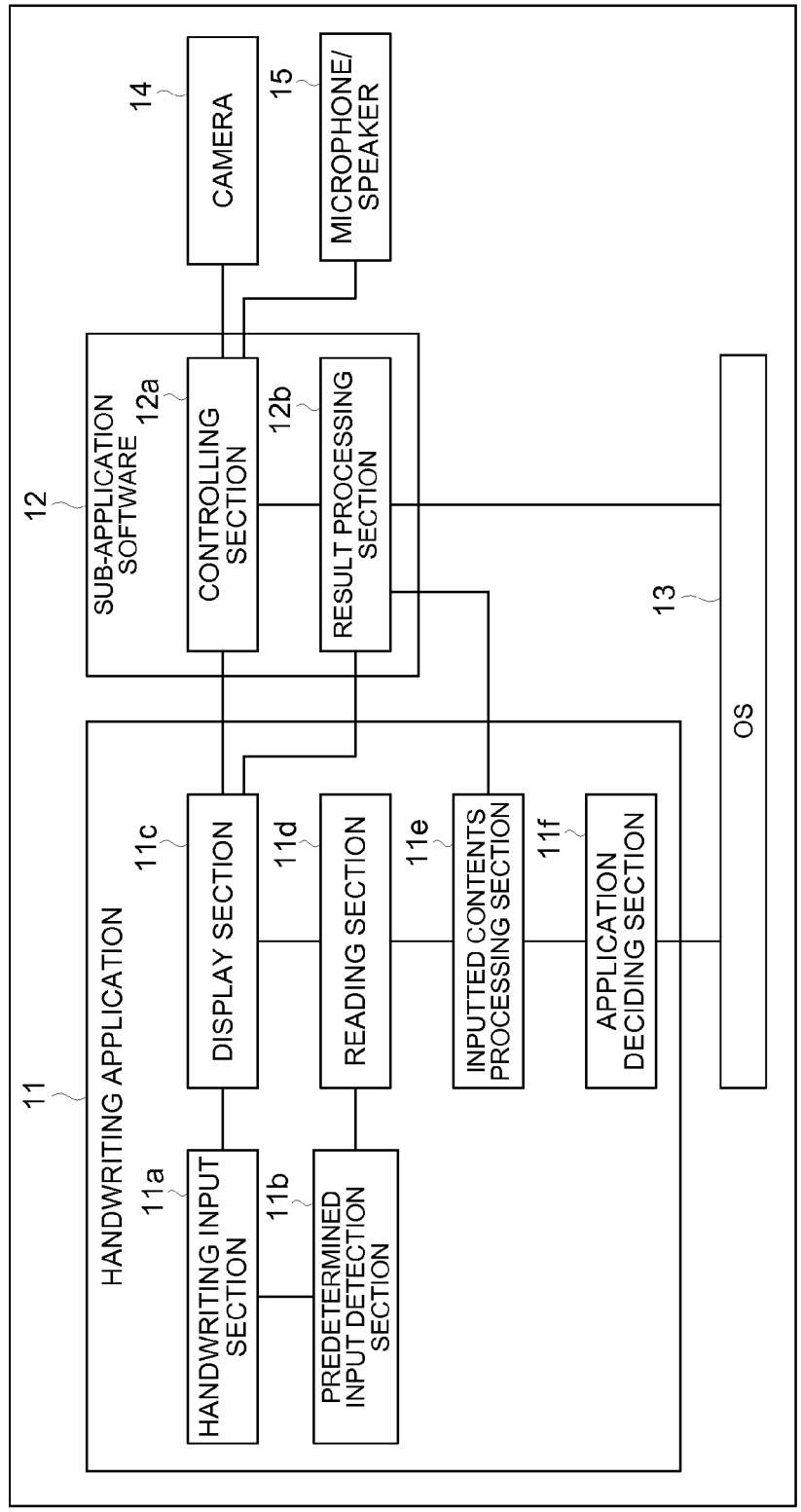

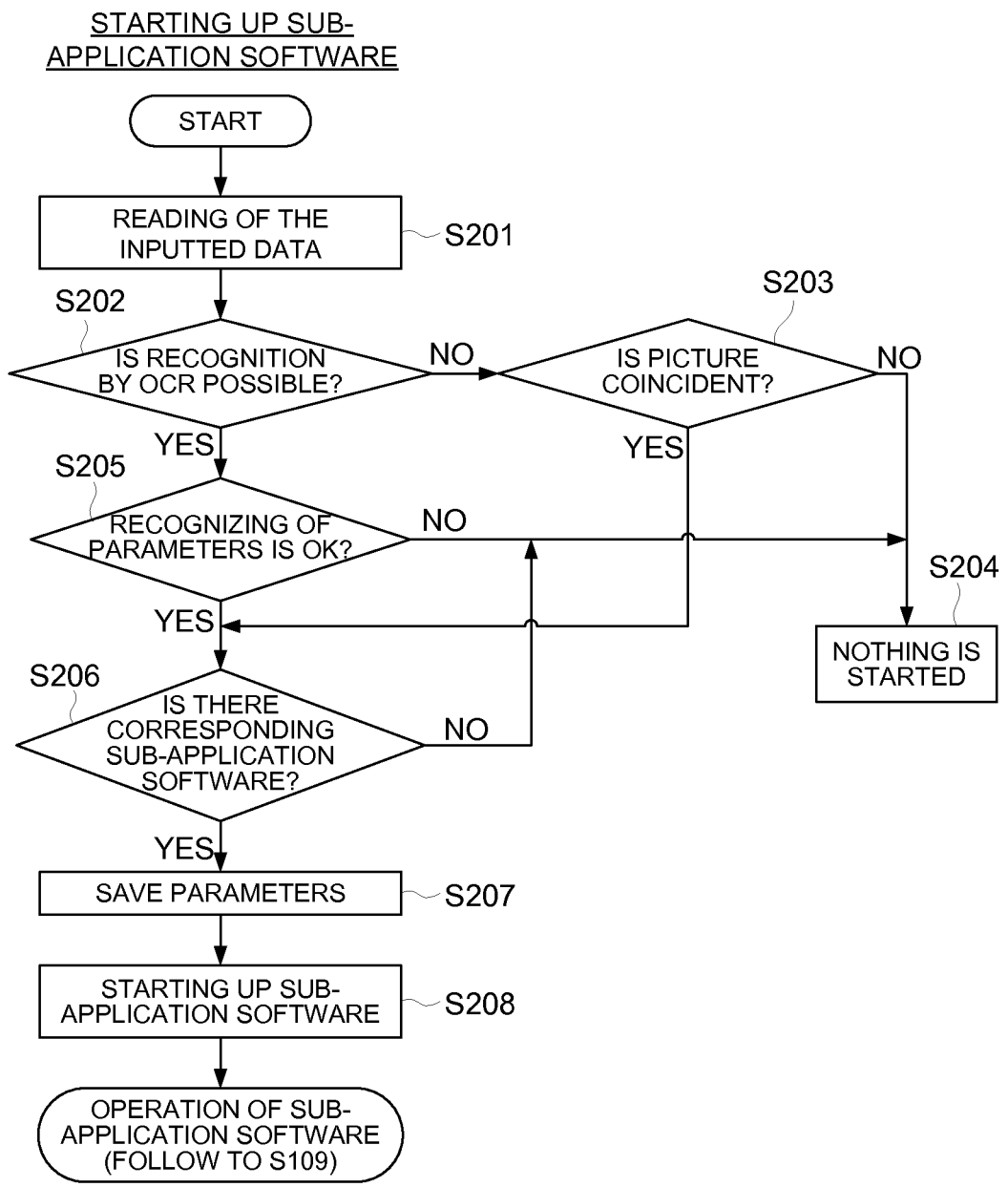

DETERMINING OF INSERTION OF
RESULT (INSERTION OF MAP)

HANDWRITING INPUT DEVICE AND HANDWRITING INPUT CONTROL PROGRAM

The present application is based on Patent Application No. 2011-240853 filed at the Japan Patent Office on Nov. 2, 2011 and which is hereby incorporated herein in its entirety.

TECHNICAL FIELD

Present invention is corresponding to the handwriting input device which equipped the handwriting input function within a touch panel, and the handwriting input control program which operates with the device concerned.

BACKGROUND

In recent years, handwriting input devices such as a tablet terminal which equipped the ability to receive and interpret handwriting input, have spread. Various type of such handwriting input devices are equipped with various functions, such as a function for taking still picture and movie by built-in camera, a function for recording sounds by the built-in microphone, a function for searching place on a map, a function as a calculator. With the handwriting input devices, if application software for handwriting input is started up, icons for starling up application software which performs various functions etc. are displayed on the screen for handwriting input, and, desired application software is started up by touching the icon.

Although it is not the technology about the above-mentioned handwriting input device, for example, Unexamined Japanese Patent Application Publication No. 2000-194869 discloses the document creation device, wherein the document creation device processing; recognizing optically frame and character string on paper etc. by handwriting input; incorporating them into personal computer etc.; starting up automatically an application software which processes the data of the statement in frame when the incorporated portion of the frame on the document is specified by cursor; and, attaching the chosen data to the position of the frame when user chose the data for pasting. And, Unexamined Japanese Patent Application Publication No. 2006-119712 discloses the information control terminal device, wherein the information control terminal device processing; starting up the built in camera when pen pressure over a predetermined value is detected in the structure of Anoto Digital Pen; starting the reading of dot pattern of a paper; and, starting the reading the written-in character.

However, in conventional handwriting input device, the user has to do operation of choosing icon for starting up desired application software, copying the information acquired by application software, determining the size and position of a place on which the copied information and pasting it, when inserting the information acquired by application software into the predetermined place of screen for handwriting input, so the operation becomes complicated and was a problem.

In view of the problems described above, it is an object of the present invention to provide a handwriting input device and a handwriting input control program by which starting of application software and use of the information acquired by the application software was simplified.

SUMMARY

1. To achieve at least one of the above mentioned objects, a handwriting input device in which a handwriting input is possible to a touch panel which is superimposed on a display screen reflecting one aspect of the present invention includes an inputted contents processing section for recognizing a content by the handwriting input and setting up a area on the display screen based on an recognition result; an application software determining section for determining an application software which should be started up based on the recognition result and starting up the application software; and a result processing section for inserting information acquired by the started application software into the area and displaying on the display screen.

2. In the abovementioned handwriting input device of item 1, wherein the inputted contents processing section sets up a rectangle area specified by a line inputted by handwriting over a character and/or a figure which is inputted by handwriting, a rectangle area surrounding a character and/or a figure which is inputted by handwriting, or a rectangle area specified by a sign with a character and/or a figure which is inputted by handwriting, as the area.

3. In the abovementioned handwriting input device of item 1, wherein the application software determining section displays a list of application software which is determined based on recognition result on the display screen, and starts application software selected from the list.

4. In the abovementioned handwriting input device of item 1, wherein the result processing section sets up an attribute of the information acquired by the application software according to a size of the area.

5. In the abovementioned handwriting input device of item 4, wherein the attribute of the information comprises at least one of a display size of an image, expansion or reduction magnification of an image, a resolution of an image, a recording time of a movie, and a recording time of a sound.

6. In the abovementioned handwriting input device of item 1, further comprises an input detecting section for detecting a pen pressure by handwriting input or a state where a specific button is depressed, wherein the inputted contents processing section, the application software determining section and the input detecting section are performed, when the pen pressure is higher than a predetermined threshold, when the specific button is depressed, or when handwriting is carried out after the specific button is depressed.

BRIEF DESCRIPTION OF THE DRAWINGS

FIG. 2 is a block diagram showing the composition of the main part of a handwriting input device concerning an embodiment of the present invention;

FIG. 4 is a flow chart showing a process (an example of a starting up process of a sub-application software) of a handwriting input device concerning an embodiment of the present invention;

DESCRIPTION OF THE PREFERRED EMBODIMENTS

As having explained as a background, it is impossible for the conventional handwriting input device to interlock the application software which processes the handwriting input and the application software which performs various functions prepared for handwriting input device. Therefore, when inserting the information acquired by application software into the predetermined place of screen for handwriting input, the user has to do operation of choosing icon and starts up desired application software, to copy information acquired by the application software, to determine the size and position of a place on which the copied information is pasted, to paste the information in the determined size and position. Such complicated operation is a problem.

Then, the embodiment of the present invention performs that, the sub-application software corresponding to contents of a handwriting input is started when a predetermined handwriting input is detected during application software which makes a handwriting input possible is operated, and inserts the information acquired by the sub-application software into the area corresponding to contents by handwriting input, automatically.

In detailed, if a predetermined handwriting input is detected (for example, pen pressure over a predetermined value is detected, or the handwriting input while the specific button is depressed is detected), contents of a handwriting input (for example, the beforehand regular matter for every sub-application software, such as a character, a rough sketch, a formula, an address, a name which points out the name of a place, latitude, longitude etc.) are interpreted, sub-application software corresponding to the contents of a handwriting input is chosen and started in the handwriting input device which is provided various software which realizes functions such as the application software (main application software) for receiving and interpreting the handwriting input by stylus or a finger, the camera application software for taking still picture or movie, the microphone application software for recording sound, the calculator application software, the map application software for searching a place on a map. And the size and position of the area corresponding to the contents of the handwriting input are determined, and the information acquired by sub-application software is inserted as determined size.

Therefore, three operations performed only by performing a handwriting input, wherein the three operations are related to a starting up of the sub-application software, a determination of area which should inserted the information acquired by sub-application software, and an insertion of the information acquired by sub-application software, as a result, a user's time and effort is saved and its convenience improves.

Embodiments

Figure 1A:
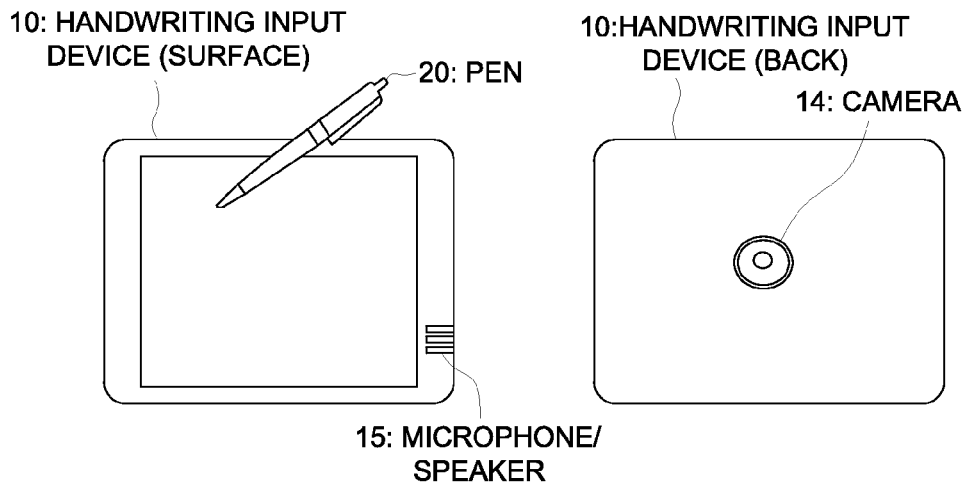
FIG. 1a is a diagram showing schematically the appearance composition and basic operations of a handwriting input device concerning an embodiment of the present invention.
Figure 1B:
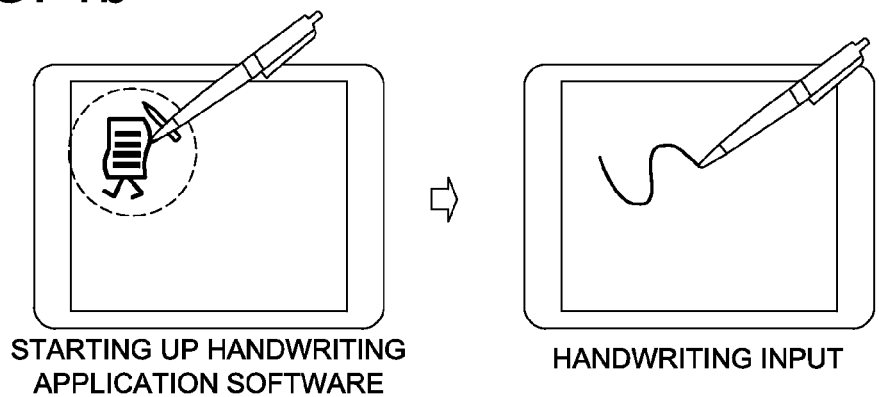
FIG. 1b is a diagram showing schematically the appearance composition and basic operations of a handwriting input device concerning an embodiment of the present invention.
Figure 1C:
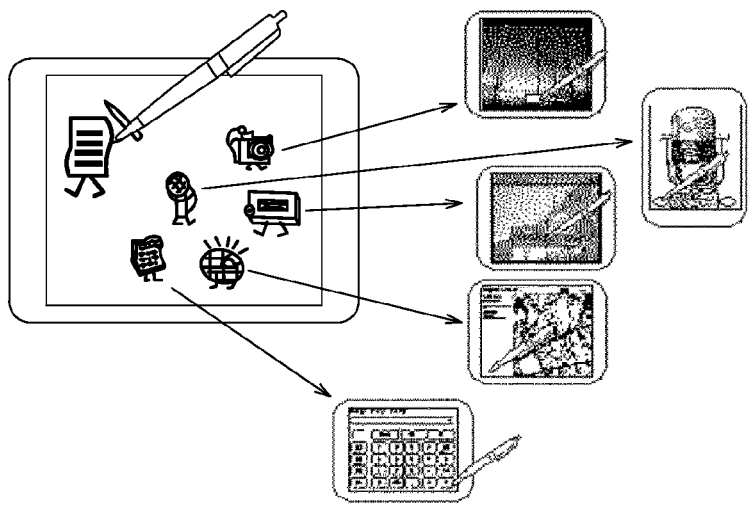
FIG. 1c is a diagram showing schematically the appearance composition and basic operations of a handwriting input device concerning an embodiment of the present invention.
Figure 5A:
FIG. 5a is a diagram showing schematically an example of a starting up process of a sub-application software of a handwriting input device concerning an embodiment of the present invention.
Figure 5B:
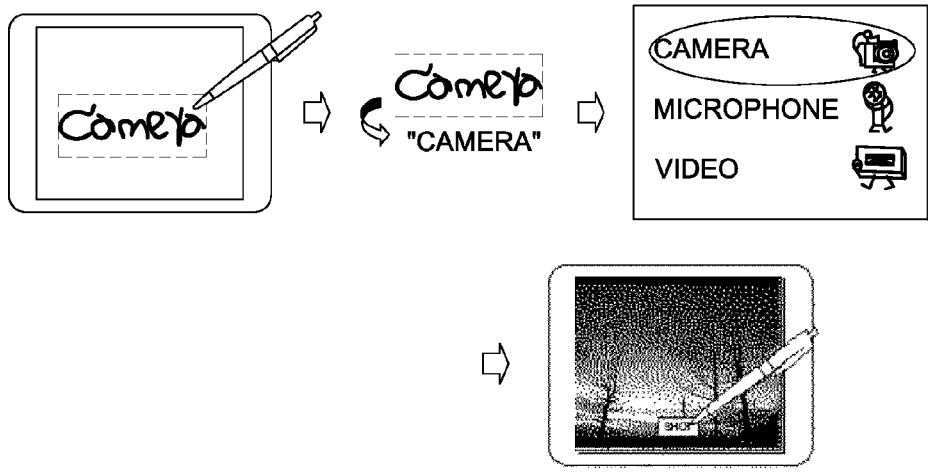
FIG. 5b is a diagram showing schematically an example of a starting up process of a sub-application software of a handwriting input device concerning an embodiment of the present invention.
Figure 5C:
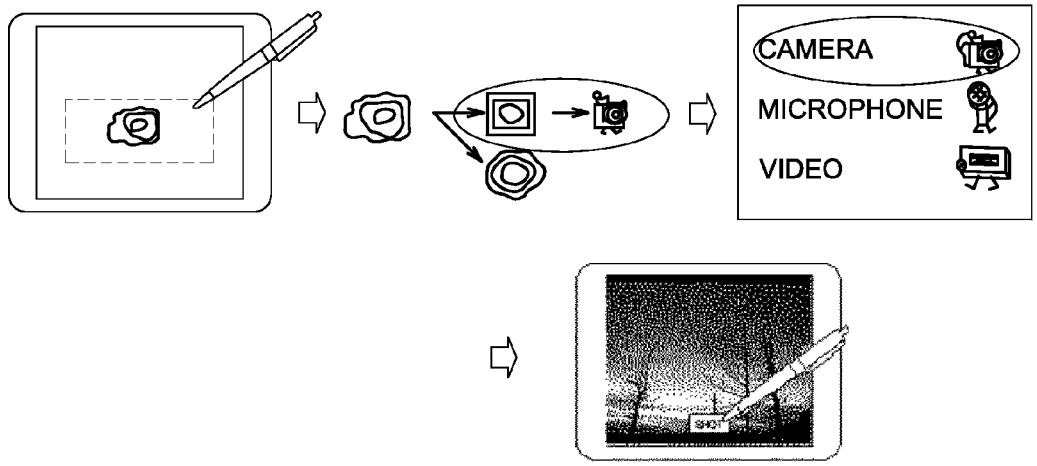
FIG. 5c is a diagram showing schematically an example of a starting up process of a sub-application software of a handwriting input device concerning an embodiment of the present invention.
Figure 6:
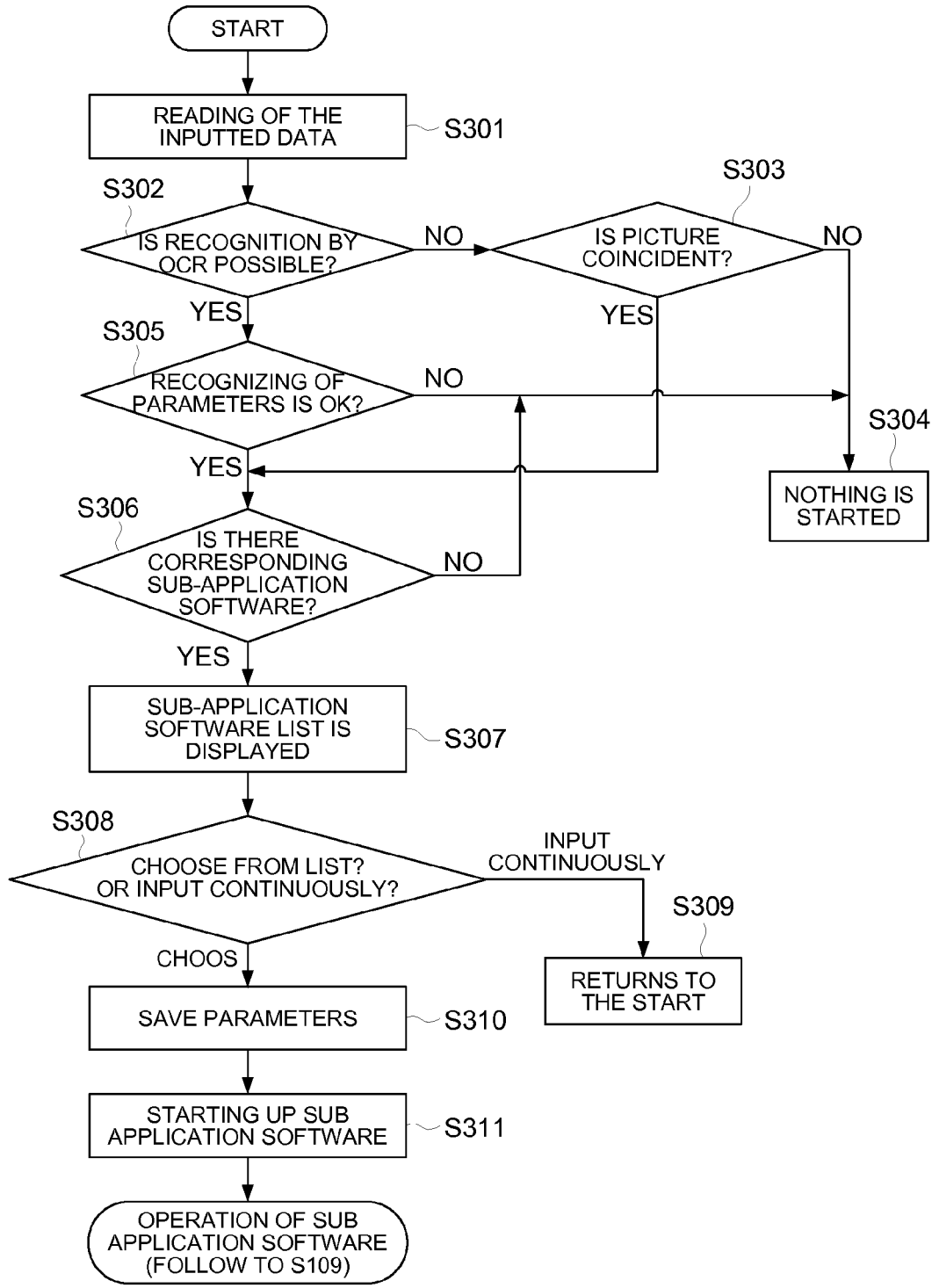
FIG. 6 is a flow chart showing a process (other example of a starting up process of a sub-application software) of a handwriting input device concerning an embodiment of the present invention.
Figure 16:
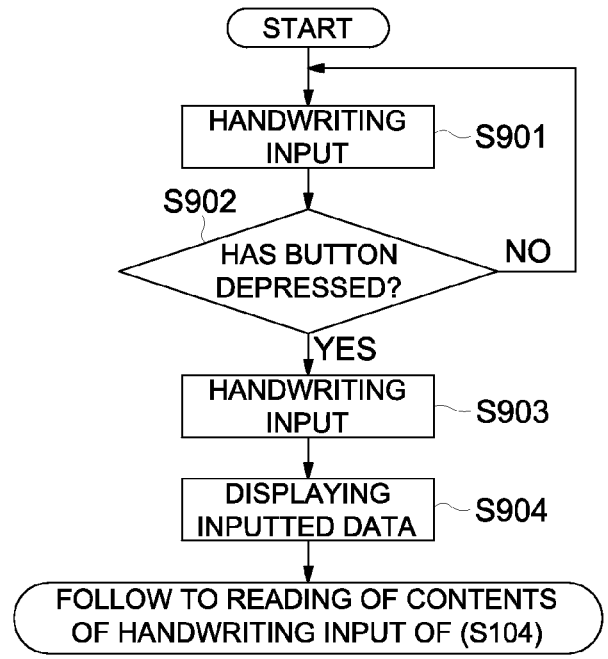
FIG. 16 is a flow chart showing a process (other example of a detecting process of a handwriting input) of a handwriting input device concerning an embodiment of the present invention.
Figure 17A:
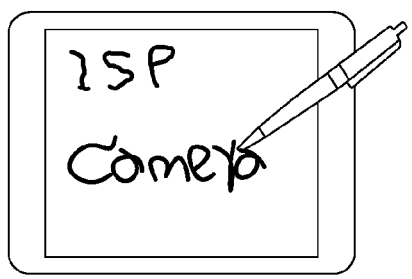
FIG. 17a is a diagram showing schematically a detecting process of a handwriting input using a handwriting input device concerning an embodiment of the present invention.
Figure 17B:
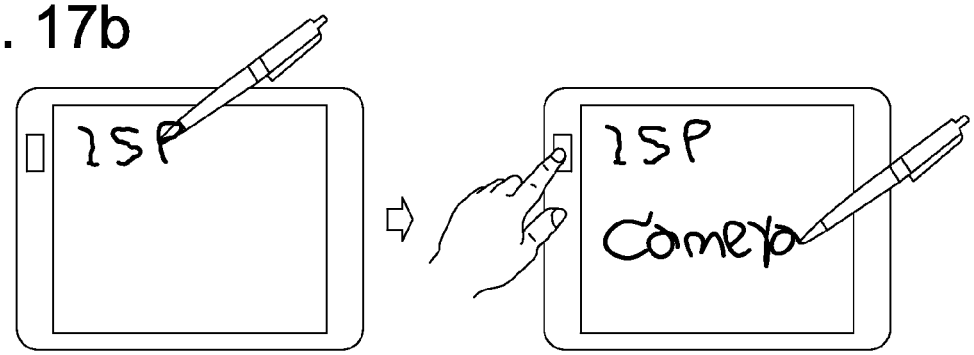
FIG. 17b is a diagram showing schematically a detecting process of a handwriting input using a handwriting input device concerning an embodiment of the present invention.

The handwriting input device and the handwriting input control program concerning one embodiment of the present invention are described still in detail with reference FIG. 1 from FIG. 17. FIG. 1 is a diagram showing schematically the appearance composition and basic operations of a handwriting input device concerning the present embodiment, and FIG. 2 is a block diagram showing the composition of the main part of a handwriting input device concerning the present embodiment. Moreover, FIGS. 3, 4, 6, 8, 9, 11, 13, 15 and 16 are flow charts showing processes of the handwriting input device concerning the present embodiment, and FIG. 5, 7, 10, 12, 14, 17 are diagrams showing schematically examples of processes of the handwriting input device concerning the present embodiment.

As shown in FIG. 1(a), the handwriting input device 10 is a tablet terminal, a mobile phone or laptop computer, which receives and interprets the handwriting input by stylus or a finger. And the handwriting input device 10 is provided with camera 14 which takes still picture and movie, microphone and speaker 15 for recording sounds, etc. The stylus is called the pen 20 by the following explanation. In addition, the appearance of handwriting input device 10 should just be composition in which not only the composition of FIG. 1 but handwriting input is possible.

As shown in FIG. 1(b), the screen for handwriting input is displayed and it will be in the state where a user can perform handwriting input on the screen by pen 20 or a finger, when the icon for starting up the handwriting application software which is displayed on screen is touched by a finger or pen 20, or when the specific button is depressed. Moreover, as shown in FIG. 1 (c), various software such as a camera application software for taking still picture, a video application software for taking movie, a voice memo application software for recording sounds, a calculator application software for calculating, an map application software map for searching and displaying etc. are installed in the handwriting input device 10, and above-mentioned various software are called sub-application software generically. When the character and rough sketch to start up such sub-application software are input by handwriting with the pen 20 or fingers, the sub-application software concerned is started up and the use of the function for taking still picture or movie, for recording sound, for calculating or for searching on the map is attained.

FIG. 2 is a block diagram showing the composition of the main part of a handwriting input device 10 concerning the present embodiment. The handwriting input device 10 is composed with handwriting application software 11, sub-application software 12, Operating System 13, a camera 14, and microphone and speaker 15. Moreover, the handwriting application software 11 is composed with a handwriting input section 11a, a predetermined input detection section 11b, a display section 11c, a reading section lid, inputted contents processing section 11e and an application software determining section 11f. And, the sub-application software 12 is composed with a controlling section 12a, a result processing section 12b.

The function of the handwriting input device 10 and the operation which were constituted as mentioned above are outlined. First, if a user writes by handwriting by pen 20 or a finger to the handwriting input section 11a (touch panel) of handwriting application software 11 which is started up as main application software, the contents of handwriting input is displayed on display section 11c (for example, Liquid Crystal Display is used). In that case, the predetermined input detection section 11b detects that there was a predetermined input (for example, the handwriting input with predetermined pen pressure or the handwriting input while specific button is depressed) in the handwriting input section 11a, the reading section 11d reads the information (contents of a handwriting input) displayed on display section 11c, inputted contents processing section 11e processes (for example, recognizing character and figure handwriting input, or specifying the size and the position of the area handwriting input) the read information. And the application software determining section 11f determines the sub-application software to start up based on the processed information, and notifies the determined software to operating system 13.

The operating system 13 starts the corresponding sub-application software 12 or the function sections of camera 14 and microphone and speaker 15 combined with the sub-application software 12, based on the received information.

The sub-application software 12 displays the controlling section 12a (for example, button for operating sub-application software 12, etc.) on the display section 11c, and the sub-application software is operated according to the operation to the controlling section 12a by a user. And the result processing section 12b inserts the information (for example, in camera application software, the information is still picture and movie, in voice memo application software, the information is a record sound, in calculator application software, the information is a calculation result, in map application software, the information is a searched map.) acquired by the sub-application software into the display section 11c based on the information processed by the inputted contents processing section 11e.

In addition, in FIG. 2, the handwriting application software 11 performs process for detecting a predetermined input, processing the inputted information, and for determining sub-application software which should be started up, on the other hand, the sub-application software 12 performs process for inserting the information acquired by sub-application software 12 into display section 11c. The composition in which other application software which operates on operating system 13 pet forms above-mentioned processes also suits the present invention (namely, handwriting application software 11 and sub-application software 12 are composed as in FIG. 2, the other application software (handwriting input control program) which controls these application software is added.)

Figure 3:
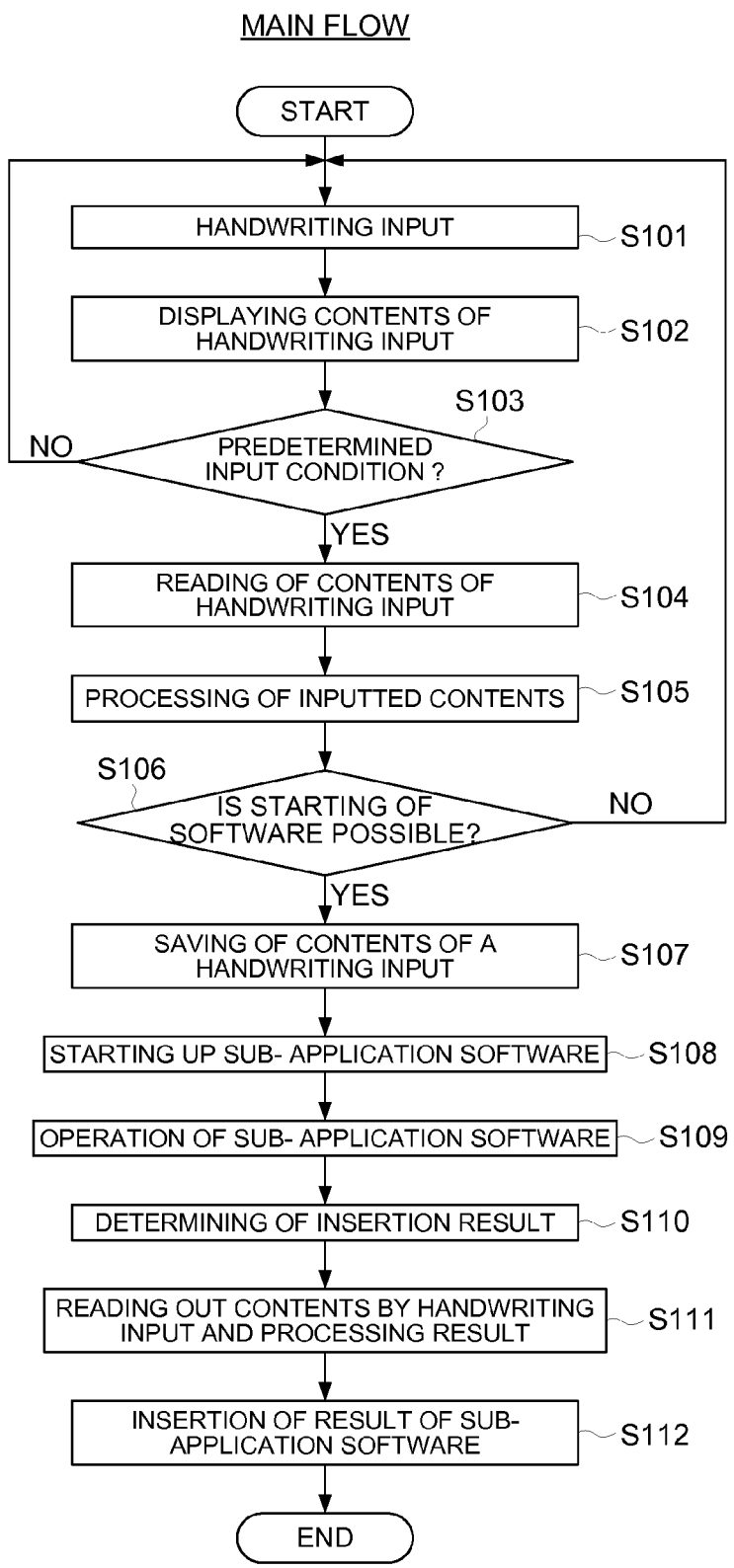
FIG. 3 is a flow chart showing main process of a handwriting input device concerning an embodiment of the present invention.

Next, basic process of handwriting input device 1 of this embodiment is explained with reference to the flow chart of FIG. 3.

First, when the operation of stroke handwriting input is performed by user to handwriting input section 11a using pen 20, a finger, etc. (S101), the display section 11c displays contents of a handwriting input on the screen (S102). Next, the predetermined input detection section 11b determines whether this handwriting input was performed on predetermined input conditions (S103). When the result is No, the process returns to S101 and repeats the process from S101 to S103. About the predetermined input conditions of the above S103 is mentioned later.

On the other hand, when the result is in Yes, a reading section 11d reads the contents of a handwriting input (S104), and inputted contents processing section 11e performs a process which interprets the read contents of a handwriting input (S105), and the application software determining section 11f determines whether the sub-application software which is started from contents of a handwriting input can be specified (S106). When the result is No, the process returns to S101, in contrast, when the result is Yes, inputted contents processing section 11e saves processed contents of a handwriting input (S107), the application software determining section 11f notifies the sub-application software to start up to the operating system 13, the notified sub-application software is started up by the operating system 13 (S108). About detailed process from S104 to S108 is mentioned later.

Next, the controlling section 12a is displayed on display section 11c by the started sub-application software, the sub-application software is operated by touch of the controlling section 12a by user (S109), and when an insertion result is determined (sub-application software acquires the information) (S110), the result processing section 12b reads out the contents of a handwriting input which is saved on S107 and processes the information which is acquired by the sub-application software (S111), and the information is inserted in screen for handwriting input of display section 11c (S112). About detailed process from S109 to S112 is mentioned later.

In addition, although as the above-mentioned flow explained, the information which is acquired by sub-application software is inserted into screen for handwriting input of display section 11c, the example of other composition is explained that, a layout information is generated for inserting the information which is acquired by sub-application software into screen for handwriting input, the information which is acquired by sub-application software and the layout information are outputted, the information and the layout information are displayed on the display section of other device.

Hereafter, detailed process of the above-mentioned flow is explained with reference to a flow charts and a schematic diagram.

[Starting Up Process of Sub-Application Software]

The starting up process of sub-application software is explained with reference to the flow chart of FIG. 4, and the schematic diagram of FIG. 5. The detailed process of Steps S104-S108 of FIG. 3 is explained. The specific character and picture (rough sketch) which is set by user are related to sub-application software, and are registered into database.

First, the reading section 11d reads out contents of a handwriting input as a reading-object (S201), the inputted contents processing section 11e performs character recognition to the read contents of handwriting input by OCR (Optical Character Reader) and a picture search to database. When character recognition by OCR is impossible (No of S202) and the read contents are not coincidence with picture which is registered to the database (No of S203), the sub-application software is not started up, but a state changes to the waiting for the handwriting input (S204 which is same as S101 of FIG. 3).

On the other hand, when character recognition by OCR is possible (Yes of S202) (Yes of S202), inputted contents processing section 11e determines the possibility of recognition of parameters such as a position and size based on the contents of a handwriting input (S205). When recognition of parameter is impossible (No of S205), the sub-application software is not started up, but a state changes to the waiting for the handwriting input (S204). When recognition of parameter is possible (Yes of S205) or coincidence with picture which is registered to the database (Yes of S203), the application software determining section 11f checks whether there is sub-application software corresponding to the character recognized by OCR process or a rough sketch coincidence with the picture which is registered to the database (S206).

When there is no corresponding sub-application software, sub-application software is not started up, but a state changes to the waiting for the handwriting input (S204). On the other hand, when corresponding sub-application software is found, the inputted contents processing section 11e saves parameters, such as a position and size (S207), the application software determining section 11f notifies the sub-application software to start up to operating system 13, and the operating system 13 starts up notified sub-application software (S208).

For example, if the character of "camera" as shown in FIG. 5 (b) is written by hand when the sub-application software is related to characters and pictures as shown in FIG. 5 (a), a character of "camera" is recognized by the character recognition of OCR, and sub-application software of camera is started up. Moreover, when a rough sketch as shown in FIG. 5 (b) is written by hand, the rough sketch is collated with the picture which is registered in the database. And since the details of the rough sketch and the picture related to camera application software are coincidence as a result of picture search, the sub-application software of camera is started up. Thus, the sub-application software of camera is started up only by operating of handwriting by user. Therefore, the convenience of user improves.

In the above-mentioned flow, although sub-application software is started up automatically based on the contents of handwriting, the example of other composition is explained that, the sub-application software which is recognized by application software determining section 11f is indicated by list and checked by user, in order to prevent starting up of the sub-application software which is not expected by user from owing to misconception of the contents of handwriting. The above-mentioned process is explained with reference to the flow chart of FIG. 6, and the schematic diagram of FIG. 7.

Like the above-mentioned flow, the target contents of a handwriting input is read by the reading section 11d (S301), the inputted contents processing section 11e performs picture search to database and character recognition by OCR to contents of a handwriting input. When character recognition by OCR is impossible (No of S302), and the picture registered to the database is not coincident with the contents (No of S303), sub-application software is not started up, but a state changes to the waiting for the handwriting input (S304).

On the other hand, when character recognition by OCR is possible (Yes of S302), the inputted contents processing section 11e determines the possibility of recognition of parameters such as a position and size based on the contents of a handwriting input (S305). When parameter is not recognized (No of S305), sub-application software is not started up, a state changes to the waiting for the handwriting input (S304). In contrast, when parameter is recognized (Yes of S305), or is coincident with the picture registered to database (Yes of S303), the application software determining section 11f checks whether there is any sub-application software corresponding to a character recognized by OCR or rough sketch which is coincident with the picture registered to database (S306).

When there is no corresponding sub-application software, sub-application software is not started up, and a state changes to the waiting for the handwriting input (S304). On the other hand, when corresponding sub-application software is found, sub-application software is started up in the above-mentioned flow, but in the present flow, the information (for example, sub-application software name) which specifies found sub-application software is displayed by list on handwriting input area on the display section 11c by application software determining section 11f (S307).

User determines whether to choose sub-application software from the list, or continue handwriting input (S308). Such process is performed because a candidate can be pared down by adding contents of a handwriting input when a plurality of sub-application software is displayed on list. And when continuing the handwriting input, process returns to the beginning of a main flow (S309), when sub-application software is chosen from the list, the inputted contents processing section 11e save parameters such as a position and size (S310), sub-application software to start up is notified to operating system 13 by application software determining section 11f, and operating system 13 starts up the notified sub-application software (S311).

Figure 7:
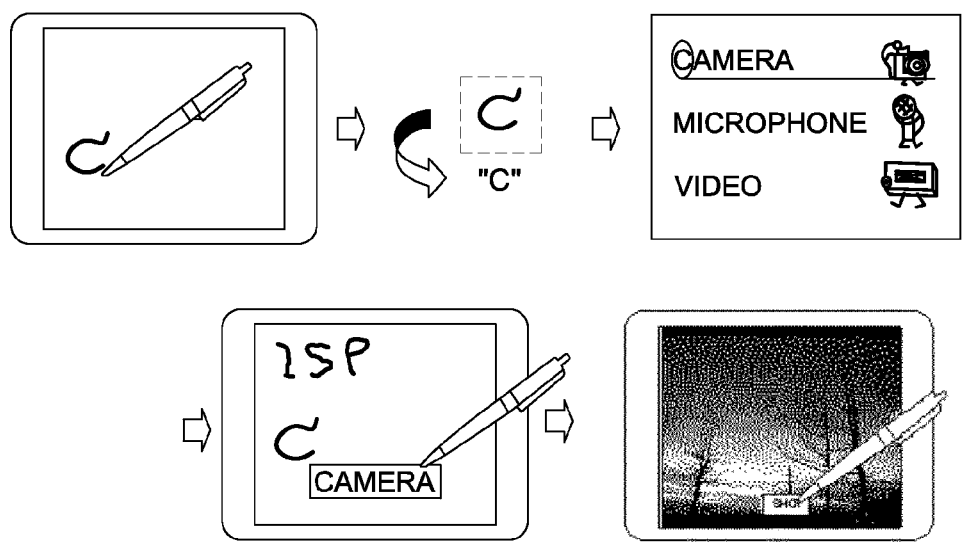
FIG. 7 is a diagram showing schematically other example of a starting up process of a sub-application software of a handwriting input device concerning an embodiment of the present invention.

For example, if the character of a "C" is written by hand as shown in FIG. 7, the character "C" is recognized by character recognition of OCR. Next, database is searched, and sub-application software related to the character strings containing a "C" is displayed by list (In this example, since the character string containing a "C" is only camera, sub-application software of camera is displayed). And user chooses and starts up desired sub-application software from the list. Moreover, although not illustrated, also when a rough sketch is written by hand, the picture whose details correspond to the picture registered to database is search for, and sub-application software related to the picture is displayed by list. Thus, if user writes the character or rough sketch related to camera by handwriting, list of sub-application software corresponding to the handwriting is displayed, and if desired application software is chosen from the list, since selected sub-application software is started up, the sub-application software which is desired by user is started up certainly.

[Process for Inserting Result]

Next, inserting process (detailed process of Steps S109-S112 of FIG. 3) of the information acquired by sub-application software is explained. In this case, in parallel to process of Steps S104-S108 of FIG. 3, the process for setting up parameter is performed, wherein the parameter specifies an area which intercalates the information acquired by sub-application software (S205 and S207 of FIG. 4, S305, S307 of FIG. 6).

Figure 8:
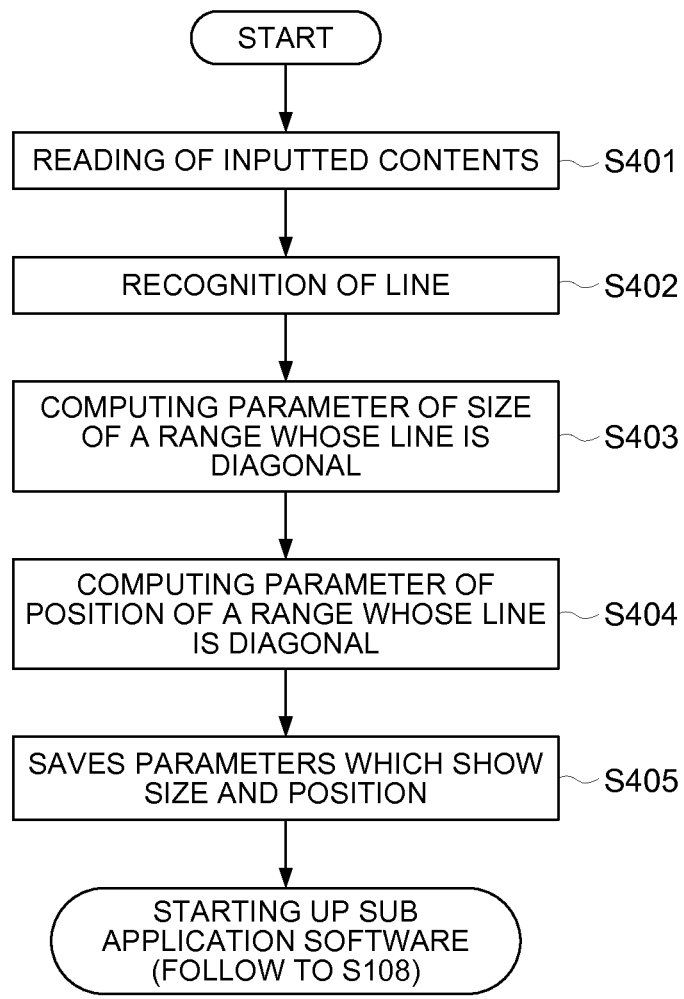
FIG. 8 is a flow chart showing process (an example of a parameter setting process for displaying the information acquired by sub-application software) of a handwriting input device concerning an embodiment of the present invention.

As concretely shown in FIG. 8, the reading section 11d reads target contents of a handwriting input (S401), and recognizes line (S402).

Next, the inputted contents processing section 11e recognizes area whose diagonal corresponds with the line, computes parameter (numerical value) which shows the size of a area in length and width (S403), and computes parameter (coordinates) which shows the position of a area (S404). Then, the inputted contents processing section lie saves parameters which show size and position (S405).

Figure 9:
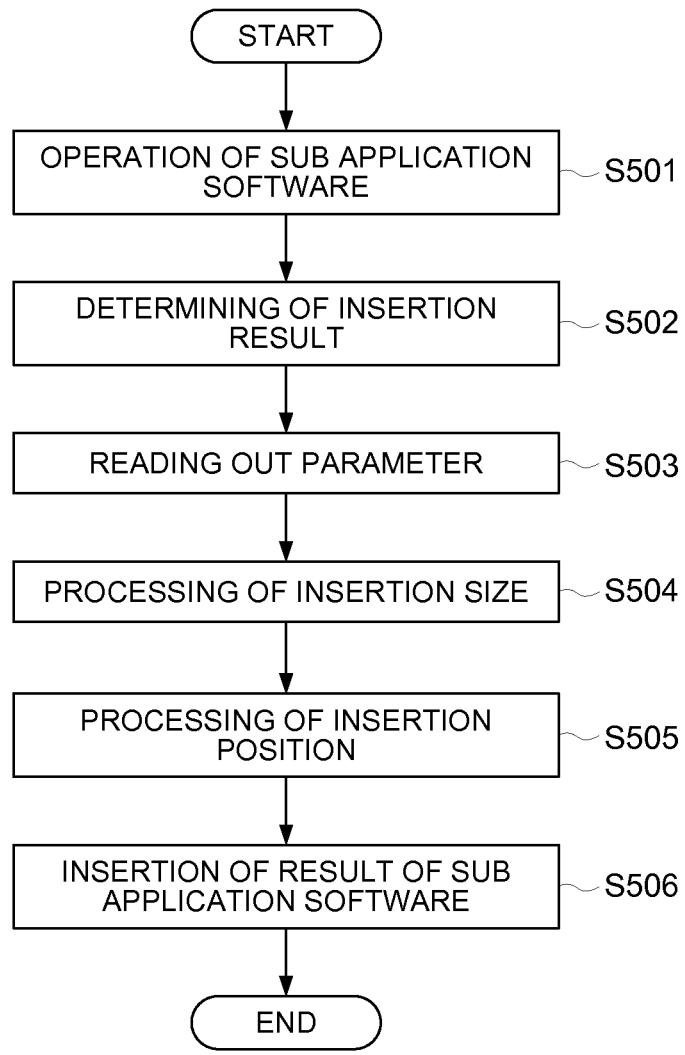
FIG. 9 is a flow chart showing process (an example of an inserting process of the information acquired by sub-application software) of a handwriting input device concerning an embodiment of the present invention.
Figure 10A:
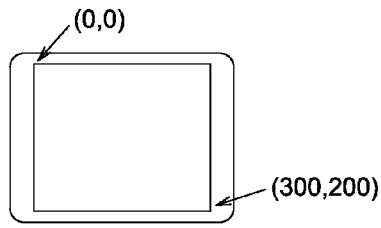
FIG. 10a is a diagram showing a size of an input of handwriting with a handwriting input device concerning an embodiment of the present invention.
Figure 10B:
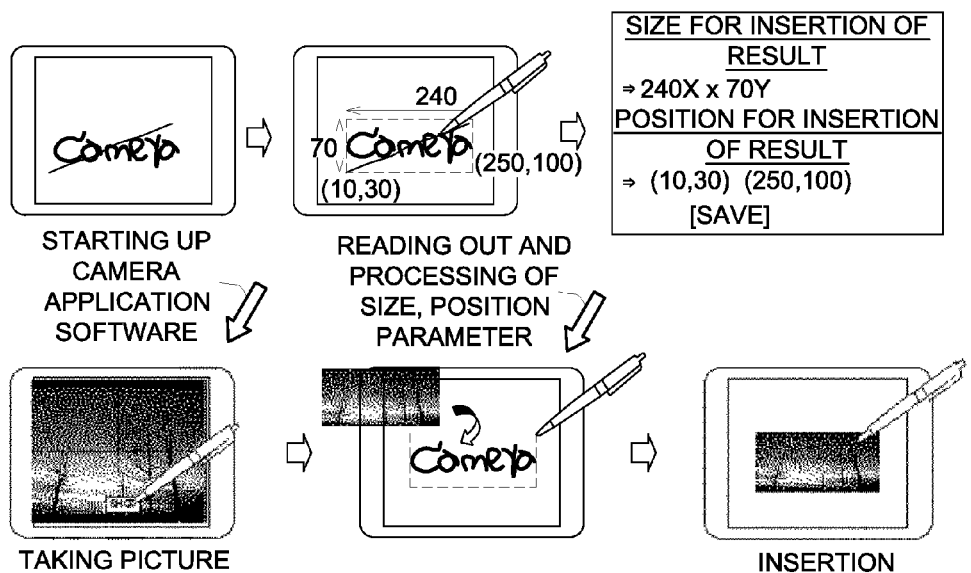
FIG. 10b is a diagram showing schematically an inserting process of a still picture which took with camera application software using a handwriting input device concerning an embodiment of the present invention.
Figure 10C:
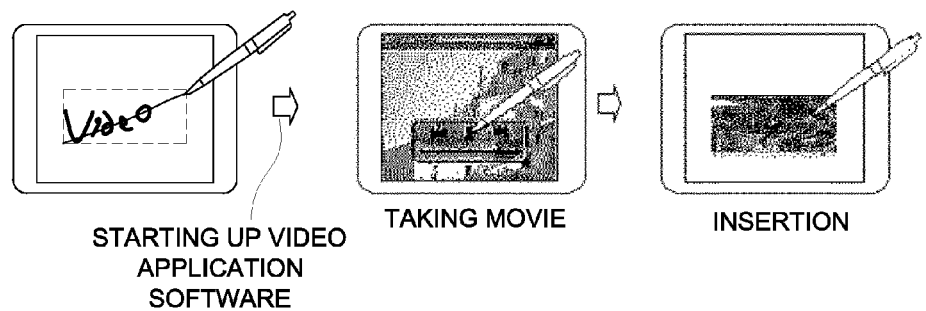
FIG. 10c is a diagram showing schematically an inserting process of a movie which took with camera application software using a handwriting input device concerning an embodiment of the present invention.
Figure 10D:
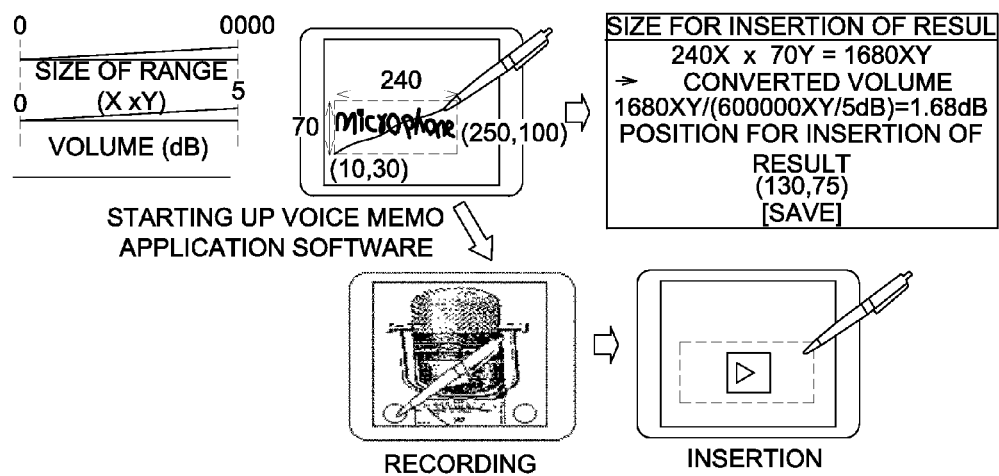
FIG. 10d is a diagram showing schematically an inserting process of a recorded sound which recorded with microphone application software using a handwriting input device concerning an embodiment of the present invention.
Figure 10E:
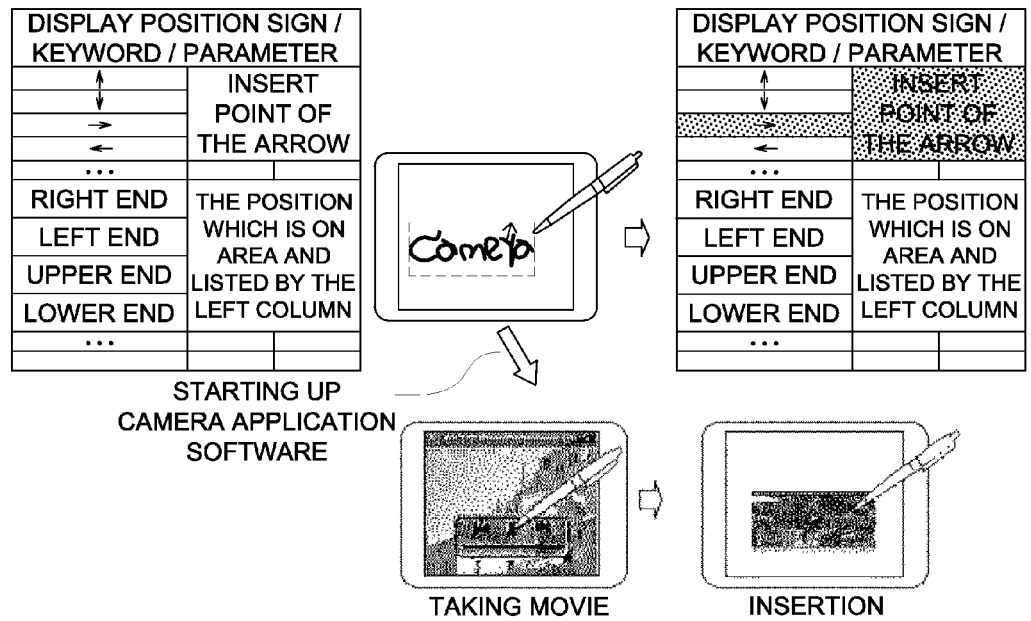
FIG. 10e is diagram showing schematically other example of inserting process of a still picture which took with camera application software using a handwriting input device concerning an embodiment of the present invention.

In this way, after setting up the area which should be inserted the result, as shown in FIG. 9, the sub-application software is operated by user (S501) and the result of insertion is fixed (S502). For example, when operated sub-application software is camera application software, shutter (shot button) is operated and a picture is acquired, when operated sub-application software is video application software, since recording start/end button is operated and movie is acquired.

Next, the inputted contents processing section 11e reads out the parameter which is saved in S405 of FIG. 8 (S503), performs a process related to the insertion size of the information which is acquired by sub-application software according to the read parameter (S504), performs a process related to the insertion position (S505). And, the result processing section 12b inserts the information acquired by application software according to the size and position of a place concerning insertion (S506).

This process is concretely explained using the schematically diagram of FIG. 10. As shown in FIG. 10 (a), a handwriting area and its size are shown by the upper left starting point and the point of the lower right where X and Y coordinates are shown by (300, 200). When taking still picture, as shown in FIG. 10 (b), while user writes the character strings of "camera" by handwriting and writes an oblique line over the character strings by handwriting, the coordinates of the rectangle whose oblique line is diagonal are acquired, the direction of X of insertion size is set as 240, the direction of Y is set as 70, and the coordinates of an insertion position are set as (10, 30), and (250, 100). And when camera application software is started up based on the handwritten character strings of "camera", user depresses shutter button and takes still picture, the taken picture is processed into insertion size (the taken picture may be expanded/reduced according to insertion size, and the area which is insertion size may be cut out from the taken picture), and the processed picture is pasted on an insertion position.

Moreover, when taking movie, as shown in FIG. 10 (c), while user writes the character strings of "Video" by handwriting and writes an oblique line over the character strings by handwriting, the coordinates of the rectangle whose oblique line is diagonal are acquired, the insertion position and size are set based on the coordinates. And when video application software is started up based on the handwritten character strings of "Video", user depresses recording start/end button and takes movie, each picture which constitutes taken movie is processed to insertion size, and processed movie is pasted on an insertion position.

Moreover, in recording, as shown in FIG. 10 (d), while user writes the character strings of "microphone" by handwriting and writes an oblique line over the character strings by handwriting, the coordinates of the rectangle whose oblique line is diagonal are acquired. Here, in the case of a sound, since it is meaningless even if it specifies insertion size, display size is set constant, and volume is changed according to insertion size instead. For example, when insertion size (X multiplied by Y) and the estimate value of volume (db) are assumed like to be the states at the upper left of a FIG. 10(d), since the insertion size is 240*70=16800, volume at the time of sound insertion is set to 16800/(60000/6 dB)=1.68 dB. And when voice memo application software is started up based on the handwritten character strings of "microphone", user depresses recording start/end button and records sound, and volume of recorded sound is processed into volume equivalent to insertion size, the play button is pasted on an insertion position and the processed sound is replayed by touching play button.

In addition, although the composition which the information acquired by sub-application software is inserted in the rectangle area which sets oblique line to diagonal is explained by the above, a curved line, a cross line, etc. become instead of oblique line which specifies a area and a rectangle area surrounding handwritten line may be set up as an insertion area, and a rectangle may be written by hand directly. Moreover, in the above-mentioned explanation, although the insertion area is specified by line, the insertion area may be specified by contents of a handwriting input. For example, as shown in an upper left table of the FIG. 10 (e), parameters of a display position sign or a keyword are assumed. And if both contents of a handwriting input and a display position sign (here upward arrow) are read, parameter (here, insertion in the position of tip of an arrow) corresponding to the read display position sign is specified, the information (here still picture) which is acquired by sub-application software may be inserted into the point of the arrow which is input by handwritten, according to this parameter.

That, the handwriting input for starting up the sub-application software and handwriting input (oblique line and display position sign) for setting up the area are performed, in order to avoid starting of the sub-application software by setting such handwriting input, although a user does not have the intention which starts up the sub-application software, when a user writes by hand the character or rough sketch which were related with sub-application software. However, if sub-application software is certainly started up when the character or rough sketch which is related with sub-application software is written by hand, an insertion area may be determined based on the handwriting input for starting up the sub-application software. In that case, the rectangle area contents of a handwriting input may be determined as an insertion area, and the area (for example, area of the predetermined form of the upper part of an screen for handwritten input) of the predetermined position on the basis of the handwriting input may be determined as an insertion area.

Figure 11:
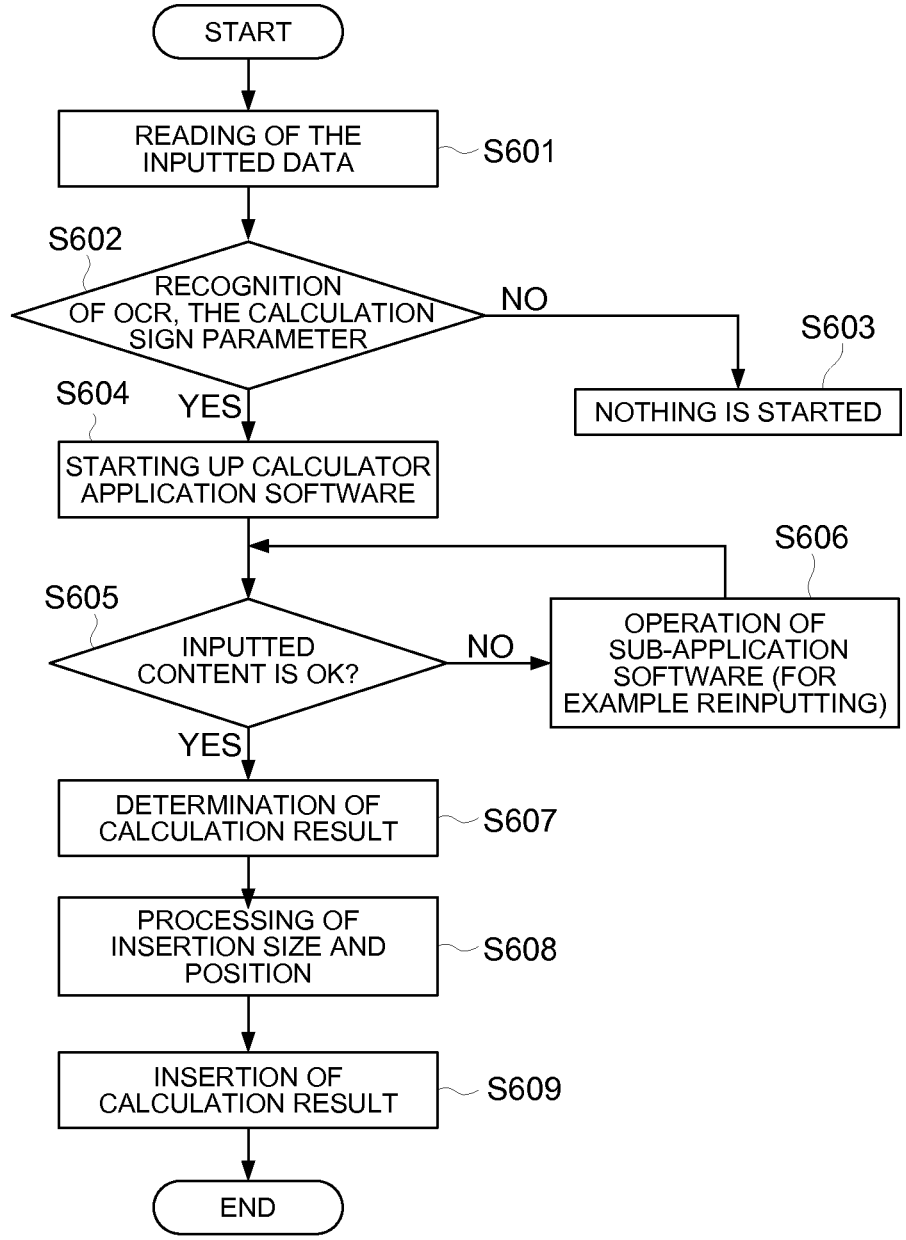
FIG. 11 is a flow chart showing a process (an example of an inserting process of the result calculated by calculator application software) of a handwriting input device concerning an embodiment of the present invention.

As mentioned above, although camera application software, video application software, and voice memo application software are explained as an example of sub-application software, the case where the result calculated by calculator application software is inserted is explained with reference to the flow chart of FIG. 11, and the schematically diagram of FIG. 12.

First, reading section 11d reads target contents of a handwriting input (S601). Next, the calculation sign parameter is confirmed by character recognition process by OCR of the inputted contents processing section 11e (S602). When calculation sign parameter is not confirmed, calculator application software is not started up, but a state changes (S101 of FIG. 3) to the waiting for the handwriting input (S603). On the other hand, when calculation sign parameter is confirmed, the calculator application software is notified to operating system 13 by the application software determining section 11, operating system 13 starts up the notified calculator application software (S604).

Next, on calculator application software, user confirms whether the contents of an input are O.K. (S605), when contents are not O.K., user operates reinputting on the calculator application software (S606). When the contents of an input are O.K., the calculation result is determined (S607). And like the above-mentioned, the process which determines insertion size and position is performed (S608), the calculation result is inserted according to the insertion size and position (S609).

Figure 12:
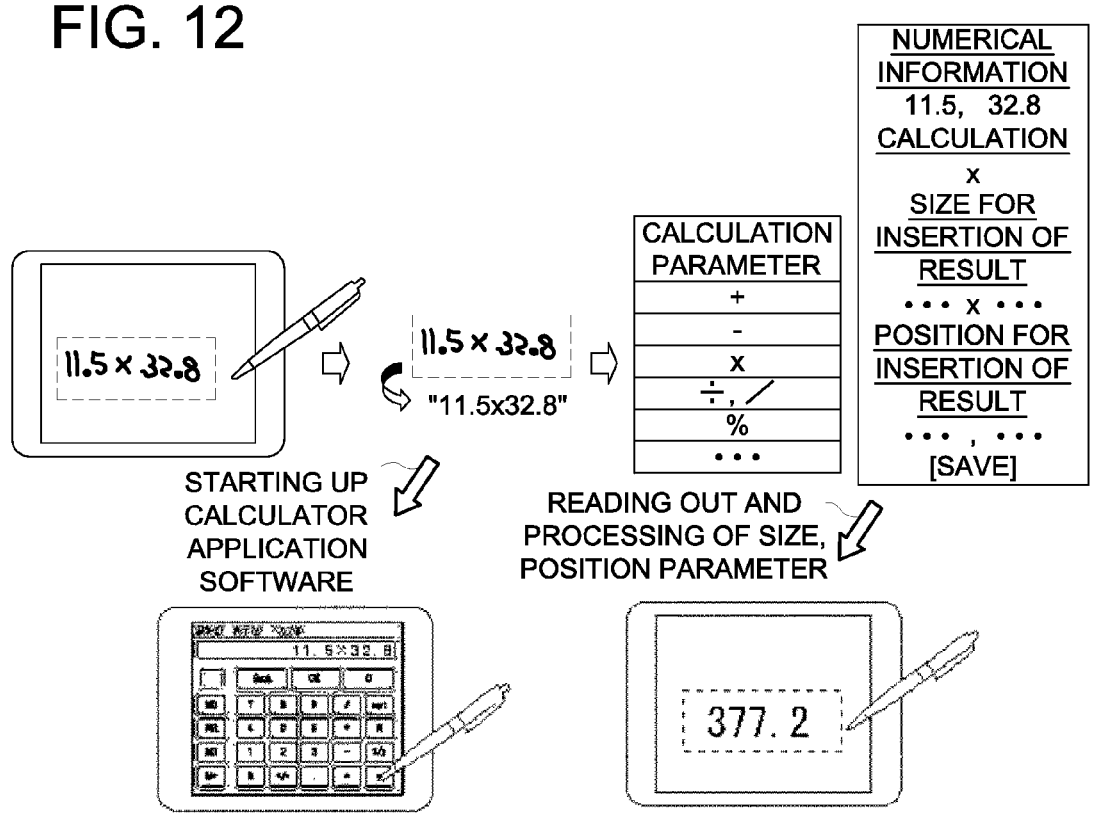
FIG. 12 is a diagram showing schematically an inserting process of the result calculated by calculator application software using a handwriting input device concerning an embodiment of the present invention.

For example, as shown in FIG. 12, by character recognition of OCR, the calculation sign parameter (+−×÷/etc.) and the character are recognized based on the contents of a handwriting input. Here, "×" of a calculation sign parameter and "11.5" and "32.8" of a numerical value is recognized. And according to the calculation sign parameter (here "×"), calculator application software is started up, a calculation result is determined by touching the "=" button of calculator application software, and the calculation result "377.2" is inserted into the area specified by parameter of insertion size and point.

Figure 13:
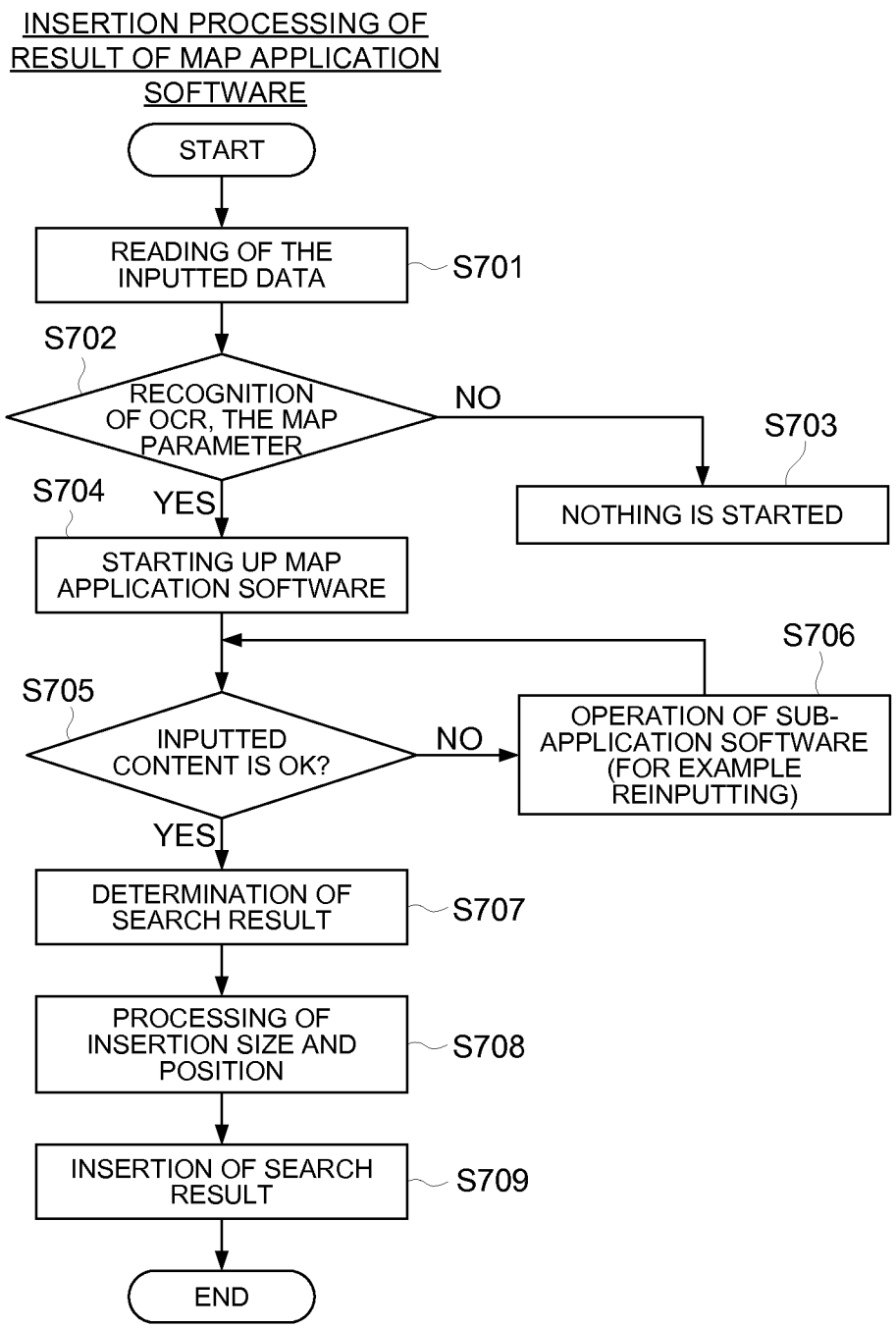
FIG. 13 is a flow chart showing a process (an example of an inserting process of a map acquired by map application software) of a handwriting input device concerning an embodiment of the present invention.

Next, the case where the map searched by map application software is inserted is explained with reference to the flow chart of FIG. 13, and the schematically diagram of FIG. 14.

First, reading section 11d reads the target contents of a handwriting input (postal code number, the name of a place, name of landmark, latitude, longitude etc.) (S701). Next, the inputted contents processing section 11e determines the map parameter by character recognition process by OCR (S702). When map parameter is not determined, the map application software is not started up, but a state changes (S101 of FIG. 3) to the waiting for the handwriting input (S703). On the other hand, when map parameter is determined, the map application software is notified to the operating system 13 by the application software determining section 11f, and the operating system 13 starts up the notified map application software, and circumference map and the photograph which includes the contents of an input on map application software are searched and displayed (S704).

Next, on the map application software, user confirms whether the contents of an input are O.K. (S705), when contents are not O.K., user operates reinputting on the map application software (S706). When the contents of an input are O.K., map search result is determined (S707). Then, like the above-mentioned, the process which determines insertion size and position is performed (S708), the map search is inserted according to the insertion size and position (S709).

Figure 14:
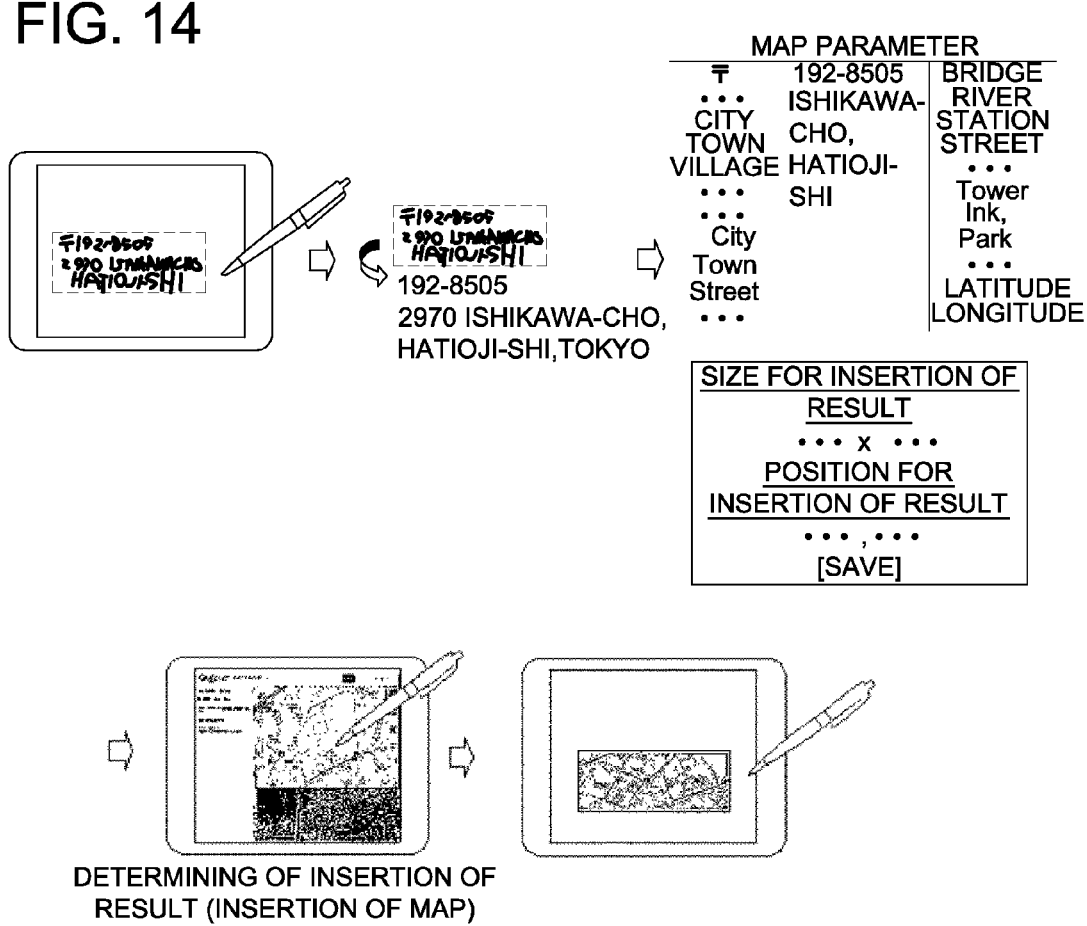
FIG. 14 is a diagram showing schematically an inserting process of a map acquired by map application software using a handwriting input device concerning an embodiment of the present invention.

For example, as shown in FIG. 14, by character recognition of OCR, the postal code number, the name of a place, name of landmark, latitude, longitude and the character are determined. Here, a "〒" (this is the Postcode sign in Japan), a "192-8505" (an example of a postal code in Japan), a "2970, Ishikawa-cho, Hachioji-shi, Tokyo" are recognized. And when it is recognized that a keyword which shows the name of a place such as Postcode sign, a "prefecture", a "county" and a "city", a keyword which shows a landmark such as a "station", a "bride", and a "Ink.", and a numeric representation containing latitude and longitude, are contained in the inputted contents, the map application software is started up, circumference map and circumference photograph corresponding to the inputted contents are searched for and displayed on map application software. The user performs operation related to a scale of map and an angle of photograph, etc., and operation of change of the inputted contents on the map application software, and determines the map or the photograph to insert. And, the map or the photograph is inserted into the area specified by parameter of insertion size and point.

In addition, although the screen of sub-application software is displayed and the information which should inset is determined in the above-mentioned explanation, it is not necessary to display the screen of sub-application software. For example, in camera application software, while live preview screen of still picture and movie is not displayed, but still picture and movie which camera application software which is acquired automatically may be inserted. Moreover, in calculator application software, screen of calculator is not displayed, but the result which calculator application software calculated automatically may be inserted.

Moreover, in the above-mentioned explanation, in camera application software, video application software, or map application software, the display size of map is determined according to the size of a handwriting area, but the attribute of the information acquired by sub-application software may be determined with display size or instead of display size. For example, expansion/reduction magnification of a picture, the resolution of the picture, or playback time of the movie may be determined according to the size of a handwriting area (for example, the resolution is made high, or the playback time is lengthened according to the enlargement of expansion magnification). Moreover, in the voice memo application software, volume is adjusted according to the size of the handwriting area, but, recording time, sound quality, etc. may be determined with size of a handwriting area or instead of the volume (for example, the recording time is lengthened, or the sound quality is made high according to the enlargement of expansion magnification).

As mentioned above, the contents of a handwriting input are recognized automatically, the sub-application software is started up, but although a user does not have the intention which starts up the sub-application software, when a user writes by hand the character or rough sketch which were related with sub-application software. Then, an example of modification is that, sub-application software is started up only when the handwriting input is performed under some specific input conditions. A process (process of S101-S103 of FIG. 3) of handwriting input device 10 in the case of performing above control is explained.

Figure 15:
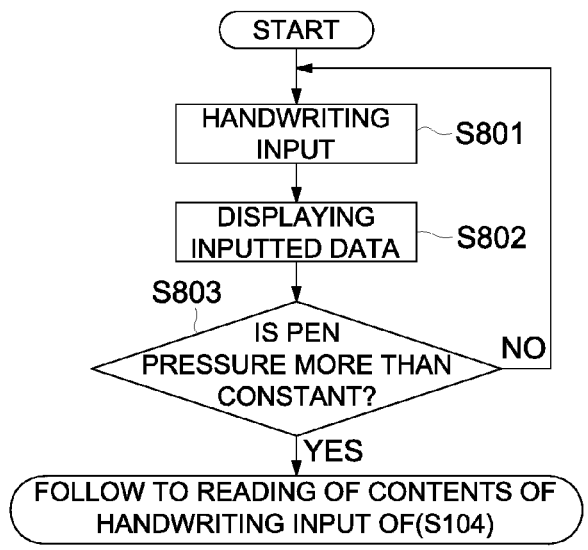
FIG. 15 is a flow chart showing a process (an example of a detecting process of a handwriting input) of a handwriting input device concerning an embodiment of the present invention.

For example, when handwriting input section 11a is touch panel of a pressure-sensitive type, as shown in FIG. 15, a stroke handwriting input is performed to the handwriting input section 11a by user (S801), the contents of a handwriting input is displayed on the display section 11c (S802). Next, the predetermined input detection section 11b determines whether this handwriting input is inputted by more than predetermined pen pressure (S803). If the pen pressure becomes under the predetermined value, it is determined that the handwriting input is usual, and return to S801, on the other hand, if the pen pressure becomes greater the predetermined value, it is determined as the starting up control of the sub-application software, and displayed contents of input data are read and processed.

Moreover, the specific button of handwriting input device 10 is provided, as shown FIG. 16, stroke handwriting input is performed to handwriting input section 11a by user (S901), and the predetermined input detection section 11b determines whether specific button has been depressed (S902). When the specific button has not been depressed, it is determined that the handwriting input is usual, and return to S901, on the other hand, when the specific button has been depressed, it is determined as the starting up control of the sub-application software, the continuing contents of a handwriting input are considered as objects of reading. And if stroke handwriting input is performed to handwriting input section 11a by user (S903), the display section 11c displays contents of a handwriting input on the screen (S904), and displayed contents of input data are read and processed.

For example, if above-mentioned pen pressure (threshold) is assumed to be 250 g, and the character "ISP" of the upper part of FIG. 17 (a) is written with the pen pressure area which is 60 g-170 g, the starting up control of sub-application software is not performed by this handwriting input. On the other hand, if the character "camera" of the lower part of FIG. 17 (a) is written with the pen pressure area which is 255 g-320 g, the starting up control of sub-application software is performed by this input by this handwriting input, and the character "camera" is considered as objects of reading.

Moreover, if the character "ISP" of the upper part of FIG. 17 (b) is written when the specific button has not been depressed, the starting up control of sub-application software is not performed by this handwriting input. On the other hand, if the character "camera" of the lower part of right part of FIG. 17 (b) is written when the specific button has been depressed, or has once been depressed, the starting up control of sub-application software is performed by this input by this handwriting input, and the character "camera" is considered as objects of reading.

Thus, by starting sub-application software only when an input by hand writing is carried out under some specific input conditions (starting up), the starting without sub-application software meaning can be lose, and the convenience of user can be raised. Then, sub-application software is started up only when the handwriting input is performed under some specific input conditions, so that start process which is not intended by user is avoided, and a convenience for user is improved.

In addition, the present invention is not limited to the statement of the above-mentioned embodiment, and unless it deviates from the meaning of the present invention, the composition and control is changed suitably. For example, in the above-mentioned embodiment, the camera application software, video application software, the voice memo application software, the calculator application software, the map application software are explained as the sub-application software, the present invention is applicable similarly to other application software which is interlocked and operated with mainly application software (handwriting application software).

Easy starting up of application software and easy use of the information acquired by the application software concerned became possible, according to the handwriting input device and handwriting input control program of the present invention.

The reason is that, the handwriting input device (handwriting input control program) in which a handwriting input is possible to a touch panel which is superimposed on a display screen controls that, recognizing a content by the handwriting input and starting up application software according to an recognition result; setting up a area on the display screen based on an recognition result; inserting information acquired by the started application software into the set area and displaying on the display screen.

Since three operations, such as starting up of application software, determining of the insertion position and size of the information acquired by application software, inserting of the information acquired by application software can be performed in one operation by handwriting input, the time and effort of user can be saved and convenience can be raised.

What is claimed is:

1. A handwriting input device in which a handwriting input is possible to a touch panel which is superimposed on a display screen comprising:
   an inputted contents processing section for recognizing a content by the handwriting input and setting up an area on the display screen based on a recognition result;
   an application software determining section for determining an application software which should be started up based on the recognition result and starting up the application software; and
   a result processing section for inserting information acquired by the started application software into the area and displaying on the display screen,
   wherein the result processing section sets up an attribute of the information acquired by the application software according to a size of the area, and
   wherein the attribute of the information comprises at least one of a resolution of an image, a recording time of a movie, and a recording time of a sound.

2. The handwriting input device of claim 1, wherein the inputted contents processing section sets up a rectangle area specified by a line inputted by handwriting over a character and/or a figure which is inputted by handwriting, a rectangle area surrounding a character and/or a figure which is inputted by handwriting, or a rectangle area specified by a sign with a character and/or a figure which is inputted by handwriting, as the area.

3. The handwriting input device of claim 1, wherein the application software determining section displays a list of application software which is determined based on recognition result on the display screen, and starts application software selected from the list.

4. The handwriting input device of claim 1, further comprises an input detecting section for detecting a pen pressure by handwriting input or a state where a specific button is depressed,
   wherein the inputted contents processing section, the application software determining section and the input detecting section are performed, when the pen pressure is higher than a predetermined threshold, when the specific button is depressed, or when handwriting is carried out after the specific button is depressed.

5. A non-transitory computer readable recording medium storing a control program which causes a handwriting input device in which a handwriting input is possible to a touch panel which is superimposed on a display screen, execute a method comprising:

an inputted contents processing step for recognizing a content by the handwriting input and setting up an area on the display screen based on a recognition result;

an application software determining step for determining an application software which should be started up based on the recognition result and starting up the application software; and a result processing step for inserting information acquired by the started application software into the area and displaying on the display screen, wherein the result processing step sets up an attribute of the information acquired by the application software according to a size of the area, and wherein the attribute of the information comprises at least one of a resolution of an image, a recording time of a movie, and a recording time of sound.

6. The non-transitory computer readable recording medium of claim 5, wherein the inputted contents processing section sets up a rectangle area specified by a line inputted by handwriting over a character and/or a figure which is inputted by handwriting, a rectangle area surrounding a character and/or a figure which is inputted by handwriting, or a rectangle area specified by a sign with a character and/or a figure which is inputted by handwriting, as the area.

7. The non-transitory computer readable recording medium of claim 5, wherein the application software determining step displays a list of application software which is determined based on recognition result on the display screen, and starts application software selected from the list.

8. The non-transitory computer readable recording medium of claim 5, further comprises an input detecting step for detecting a pen pressure by handwriting input or a state where a specific button is depressed, wherein the inputted contents processing step, the application software determining step and the input detecting step are performed, when the pen pressure is higher than a predetermined threshold, when the specific button is depressed, or when handwriting is carried out after the specific button is depressed.

\* \* \* \* \*